United States Patent [19]

Isayama et al.

[11] Patent Number: 4,631,322

[45] Date of Patent: Dec. 23, 1986

[54] CURABLE COMPOSITION OF PHENOLIC RESIN AND POLYETHER CONTAINING SILICONE CONTAINING REACTIVE GROUP

[75] Inventors: Katsuhiko Isayama; Toshifumi Hirose; Takahisa Iwahara; Fumio Kawakubo, all of Kobe, Japan

[73] Assignee: Kanegafuchi Kagaku Kogyo Kabushiki Kaisha, Osaka, Japan

[21] Appl. No.: 721,017

[22] Filed: Apr. 8, 1985

[30] Foreign Application Priority Data

Apr. 9, 1984 [JP] Japan ................................. 59-70508

[51] Int. Cl.$^4$ ...................... C08L 61/10; C08L 61/14; C08L 71/02
[52] U.S. Cl. .................................. 525/480; 525/405; 525/474; 524/14; 524/541; 521/136
[58] Field of Search ................ 525/405, 480, 474, 407

[56] References Cited

U.S. PATENT DOCUMENTS

| | | | |
|---|---|---|---|
| 3,620,821 | 11/1971 | Jones | 525/474 |
| 3,657,383 | 4/1972 | Silver | 525/405 |
| 4,413,086 | 11/1983 | Chang et al. | 525/480 |
| 4,463,115 | 7/1984 | Hirose et al. | 525/403 |

FOREIGN PATENT DOCUMENTS 0553513  2/1958  Canada .............................. 525/480

Primary Examiner—Wilbert J. Briggs, Sr.
Attorney, Agent, or Firm—Armstrong, Nikaido, Marmelstein & Kubovcik

[57] ABSTRACT

A curable composition comprising (A) a phenol resin and (B) 1 to 200 parts by weight of, per 100 parts by weight of the phenol resin, a polyether having at least one silicon-containing reactive group, which provides a cured product having improved properties such as flexibility, impact resistance, toughness, peeling strength and tensile strength.

7 Claims, No Drawings

CURABLE COMPOSITION OF PHENOLIC RESIN AND POLYETHER CONTAINING SILICONE CONTAINING REACTIVE GROUP

BACKGROUND OF THE INVENTION

The present invention relates to a curable composition containing a phenol resin and a polyether having a silicon-containing reactive group, which provides a cured product having improved properties in flexibility, impact resistance, toughness and strength.

A phenol resin has hitherto been used for various purposes, for instance, used as molding materials, adhesives and paint or coating materials, or in plywoods and laminates. However, it has the defect that the cured product is brittle, which is a problem common to these uses.

Various polymers having a silicon-containing reactive group are known. For instance, hydrolyzable silyl group-containing polymers are curable to form cured products by exposure to moisture in the atmosphere. A polyether having a silicon-containing reactive group has an interesting property such that it is cured even at ordinary temperature to form a rubber-like elastomer, but has the defect that the strength of the cured product is small and, therefore, is restricted in its uses.

An object of the present invention is to improve the brittleness of the cured phenol resin and the strength of the cured polyether having a silicon-containing reactive group.

A further object of the present invention is to provide a curable composition of a phenol resin which eliminates the defects of the cured phenol resin, namely impact resistance, flexibility, toughness, peeling strength and the like.

A still further object of the present invention is to provide a curable composition of a polyether having a silicon-containing reactive group which eliminates the defects of the cured polyether, namely strength and the like.

These and other objects of the present invention will become apparent from the description hereinafter.

SUMMARY OF THE INVENTION

In accordance with the present invention, there is provided a curable composition comprising (A) a phenol resin and (B) 1 to 200 parts by weight of, per 100 parts by weight of the phenol resin, a polyether having at least one silicon-containing reactive group in its molecule.

DETAILED DESCRIPTION

The phenol resins used as the component (A) in the present invention are not limited to specific ones, but any known phenol resins can be used in the present invention. Representative examples of the phenol resin (A) are, for instance, resol-type and novolak-type phenol resins obtained by condensation reaction of phenolic compounds, e.g. phenol, cresol, xylenol, resorcinol, an alkylphenol, and a modified phenol such as cashew nut shell oil modified phenol or tall oil modified phenol, with aldehyde compounds, e.g. formaldehyde and paraformaldehyde; and nitrogen-containing phenol resins obtained by condensation reaction of the above-mentioned phenolic compounds and aldehyde compounds in the presence of a catalyst such as ammonia or an amine compound. The phenol resins may be employed alone or in admixture thereof.

The polyethers having at least one silicon-containing reactive group in its molecule, which are used as the component (B) in the present invention, are polyethers the main chain of which has substantially a recurring unit of the formula: —R—O— wherein R is an alkylene group having 2 to 4 carbon atoms, for instance, represented by the formulas:

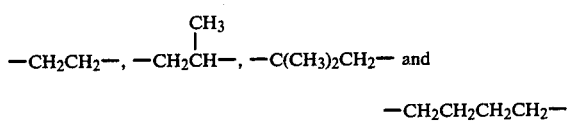

and may contain urethane linkage, ester linkage or carbonate linkage in the chain, and which have a molecular weight of about 500 to about 50,000, especially about 1,000 to about 15,000 and at least one silicon-containing reactive group, preferably 1.2 to 6 reactive groups, in the molecule. When the number of the silicon-containing reactive groups included in the polymer molecule is less than 1, the curing tends to be insufficient and the desired improvements are hard to be obtained.

Oxypropylene units are particularly preferred as recurring units constituting the main chain of the polyethers, because of being good in water resistance, being inexpensive and being easy to handle in the form of a liquid.

The silicon-containing reactive groups included in the polyethers include, for instance, silicon-containing hydrolyzable groups (e.g. a hydrolyzable silyl group), and silanol groups.

The term "silicon-containing hydrolyzable group" as used herein means a group wherein at least one silicon atom is combined with a hydrolyzable group which is subject to hydrolysis by moisture in the presence of or in the absence of a silanol condensation catalyst. Example of the hydrolyzable group linking to silicon atom are, for instance, hydrogen atom, a halogen atom, an alkoxyl group, a ketoxymate group, an amino group, an amide group, an aminoxy group, a mercapto group, an alkenyloxy group, and other known hydrolyzable groups. The alkoxyl group is particularly preferred in that the hydrolyzability is adequate and accordingly the polyether is easy to handle. One to three hydrolyzable groups may link to one silicon atom.

The number of silicon atoms constituting the silicon-containing hydrolyzable group may be one or more. In case of silicon atoms linked by siloxane linkages, the silicon-containing hydrolyzable groups with at most 20 silicon atoms are adoptable without any problems.

Representative examples of the silicon-containing hydrolyzable group are, for instance, a hydrolyzable siloxanyl group of the formula:

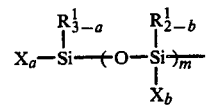

wherein X is a hydrolyzable group, $R^1$ is a monovalent hydrocarbon group having 1 to 20 carbon atoms or an organosiloxy group, "a" is 0, 1, 2 or 3, "b" is 0, 1 or 2, and "m" is 0 or an integer of 1 to 18, preferably a group of the formula:

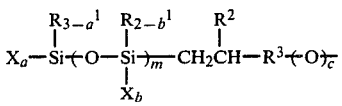

wherein X, $R^1$, "a", "b" and "m" are as defined above, $R^2$ is hydrogen or a monovalent organic group having 1 to 20 carbon atoms such as a hydrocarbon group, $R^3$ is a bivalent organic group having 1 to 20 carbon atoms such as a hydrocarbon group, and "c" is 0 or 1.

For economical reason, preferable silicon-containing hydrolyzable group is a hydrolyzable silyl group of the formula:

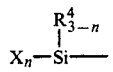

wherein X is a hydrolyzable group, $R^4$ is hydrogen or a hydrocarbon group having 1 to 10 carbon atoms such as an alkyl, aryl or aralkyl group, and n is an integer of 1 to 3.

The silicon-containing hydrolyzable group can be introduced into a polyether, for instance, by the following methods.

(1) A copolymerizable monomer having an epoxy group and a silicon-containing hydrolyzable group, e.g. γ-glycidoxypropyltrimethoxysilane or γ-glycidoxypropylmethyldimethoxysilane, is copolymerized with an alkylene oxide such as propolylene oxide or ethylene oxide to produce a polyether having a hydrolyzable silicon-containing group in the side chains.

(2) A polyoxyalkylene polyol such as polyoxypropylene polyol or polyoxytetramethylene diol is reacted with a compound having a functional group, e.g. isocyanato group, capable of reacting with hydroxyl group of the polyoxyalkylene polyol, and having a silicon-containing hydrolyzable group, thereby introducing a silicon-containing hydrolyzable group into the polymer chain end.

(3) A polyisocyanate compound is reacted with hydroxyl group of a polyoxyalkylene polyol as stated in the above item (2) to produce a compound having an isocyanato group, and the produced compound is reacted with a compound having both a silicon-containing hydrolyzable group and a group capable of reacting with isocyanato group, such as carboxyl group, hydroxyl group, mercapto group or amino group, thereby introducing the silicon-containing hydrolyzable group into the polymer chain end.

(4) Hydroxyl group of a polyoxyalkylene polyol as stated in the above item (2) is reacted with an olefin-containing compound, e.g. a halogenated allyl compound or an acrylic acid halide, to introduce olefin group into the polyoxyalkylene polyol, and the product is then reacted with a compound having both a silicon-containing hydrolyzable group and a group capable of reacting with the olefin group, e.g. a silicon hydride residue, mercapto group or amino group, thereby introducing the silicon-containing hydrolyzable group into the polymer chain end.

In the above methods (3) and (4), isocyanato group or olefin group is introduced to a polyoxyalkylene polyol followed by introduction of the silicon-containing hydrolyzable group, but other functional groups than isocyanato group and olefin group can be utilized so long as they are able to finally introduce the silicon-containing hydrolyzable group into the polyoxyalkylene polyol.

In the present invention, silanol groups can be utilized as the silicon-containing reactive group as well as the silicon-containing hydrolyzable group. These silanol groups may be those derived from the silicon-containing hydrolyzable group by hydrolysis.

Representative examples of the silanol group are, for instance, a siloxanyl group of the formula:

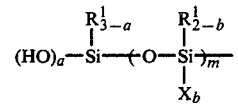

wherein $R^1$ is a monovalent hydrocarbon group having 1 to 20 carbon atoms or an organosiloxy group, "a" is 0, 1, 2 or 3, "b" is 0, 1 or 2, and "m" is 0 or an integer of 1 to 18, preferably a group of the formula:

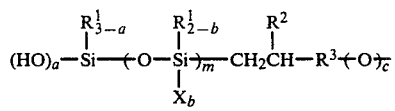

wherein $R^1$, "a", "b" and "m" are as defined above, $R^2$ is hydrogen or a monovalent organic group having 1 to 20 carbon atoms such as a hydrocarbon group, $R^3$ is a bivalent organic group having 1 to 20 carbon atoms such as a hydrocarbon group, and "c" is 0 or 1.

The polyethers having at least one silicon-containing reactive group in their molecule are preferably those having the silicon-containing reactive group at the polymer chain end. When the reactive group is present at the polymer chain end, the amount of the effective crosslinking chain derived from the polyether (B) included in the cured product becomes large, and accordingly the rubber-like elastomeric property is easy to be revealed effectively, thus the brittleness of a phenol resin can be effectively improved. On the other hand, in case of preparing a rubber-like cured product composed predominantly of the polyether (B), the use of such a polyether having the reactive group at the chain end is easy to provide a cured product having a high strength.

The polyethers (B) as mentioned above are disclosed, for instance, in Japanese Examined Patent Publication (Tokkyo Kokoku) Nos. 36319/1970, 12154/1971 and 32673/1974 and in Japanese Unexamined Patent Publication (Tokkyo Kokai) Nos. 156599/1975, 73561/1976, 134095/1978, 6096/1979, 13767/1980, 13768/1980, 82123/1980, 123620/1980, 125121/1980, 131021/1980, 131022/1980, 135135/1980 and 137129/1980. These polyethers are useful as the component (B) in the present invention, but the polyethers (B) usable in the invention are not limited to those disclosed in the above publications.

The curable composition of the present invention contains, as essential components, the phenol resin (A) and the polyether (B) having a silicon-containing reactive group. The amount of the component (B) is from 1 to 200 parts by weight per 100 parts by weight of the component (A). When the amount of the component (B) is less than 1 part by weight, it is hard to improve the impact resistance, toughness or the like. When the amount of the component (B) is more than 200 parts by weight, the obtained rubber-like cured product is insufficient in strength. The preferable proportion of the components (A) and (B) varies depending on the objects and the uses of the curable composition, and cannot be generically determined. For instance, when it is desired to improve the impact resistance, flexibility, toughness, peeling strength, etc. of a cured product of the phenol resin used as the component (A), the component (B) is employed preferably in an amount of 1 to 100 parts by weight, especially 5 to 100 parts by weight, per 100 parts by weight of the phenol resin (A). When it is desired to improve the strength of a cured product of the polyether having a silicon-containing reactive group used as the component (B), the component (B) is employed preferably in an amount of 80 to 200 parts by weight, especially 100 to 200 parts by weight, per 100 parts by weight of the component (A).

Methods for preparing the curable composition of the present invention containing the components (A) and (B) as essential components are not limited to particular ones. Usual methods are adoptable, and for instance, the composition is prepared by kneading the components (A) and (B) under heating by rolls or a kneader, or by dissolving the components (A) and (B) in a small amount of an adequate solvent.

The curable composition of the present invention may contain various additives, as occasion demands, e.g. fillers, plasticizers, silanol condensation catalysts as usually used for curing the component (B) such as metal salts of carboxylic acids, organo tin compounds and amines, antioxidants, ultraviolet absorbents, lubricants, silane coupling agents used usually such as aminosilane, pigments, and foaming agents. For instance, in case of using a filler, there can be effectively used fillers which are generally used for a phenol resin, such as wood flour, pulp, cotton chip, asbestos, glass fiber, mica, walnut shell flour, rice hull flour, graphite, diatomaceous earth and terra abla. Other fillers are also usable, such as fumed silica, finely devided anhydrous silica, silicic dioxide, carbon black, calcium carbonate, clay, talc, titanium dioxide and magnesium carbonate. The fillers may be employed alone or in admixture thereof.

The composition of the present invention can be molded by various known molding methods without restriction. When the phenol resin (A) is included in a larger amount than the component (B), methods generally used for molding a phenol resin, e.g. compression molding, transfer molding and injection molding, are preferably applied to molding of the composition of the invention, whereby moldings having improved impact resistance, flexibility, toughness or the like and laminated goods such as copper clad laminate and reinforced wood are obtained. The composition containing a major amount of the component (A) is also useful as an adhesive having an improved peeling strength, a phenol resin foam having an improved flexibility, a binder for fiber boards and particle boards, a paint material, a binder for shell molding, a binder for brake lining, a binder for grindstones, a binder for glass fibers, and the like.

When the component (B) is included in a larger amount than the phenol resin (A), the composition of the invention is molded preferably by methods usually adopted for molding of solid rubbers such a natural rubber or liquid rubber polymers such as polyurethane, whereby molded rubber products and rubber foams having an improved strength are obtained. Such a composition is also suitable as a rubber type adhesive, a sealing material, and the like.

In case of using a novolak type phenol resin as a component (A), it is desirable to use a hardening or curing agent such as aldehyde or hexamethylenetetramine upon curing.

The present invention is more specifically described and explained by means of the following Examples in which all parts are by weight. It is to be understood that the present invention is not limited to the Examples, and various changes and modifications may be made in the invention without departing from the spirit and scope thereof.

In order to illustrate the preparation of a polyether having a silicon-containing reactive group used as a component (B) in the present invention, Reference Examples are also given below.

REFERENCE EXAMPLE 1

A flask equipped with a stirrer was charged with 300 g of polypropylene glycol having an average molecular weight of 3,000, and to the flask were added 26 g of toluene diisocyanate and 0.2 g of dibutyl tin dilaurate. The reaction was carried out at 100° C. for 5 hours in a nitrogen stream with stirring. To the flask was added 22.1 g of γ-aminopropyltriethoxysilane, and the reaction was continued at 100° C. for 3 hours with stirring to give a polyether having an average molecular weight of 6,600 and having triethoxysilyl group in the chain end and about 2 silicon-containing reactive groups in the polymer chain.

REFERENCE EXAMPLE 2

A pressure reactor equipped with a stirrer was charged with 800 g of polypropylene oxide having an average molecular weight of 8,000 and having allyl ether groups in 97% of the whole polymer ends. To the reactor were added 15 g. of methyldimethoxysilane and then 0.34 ml. of a solution of chloroplatinic acid catalyst prepared by dissolving 8.9 g. of $H_2PTCl_6.6H_2O$ in 18 ml. of isopropanol and 160 ml. of tetrahydrofuran, and the reaction was carried out at 80° C. for 6 hours. As a result of determination of the residual hydrosilyl group in the reaction mixture by infrared spectrophotometry, it was found that most of the silane compound were reacted. By detemination of the silicon-containing groups by nuclear magnetic resonance, it was confirmed that polypropylene oxide having about 1.7

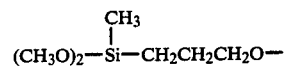

groups per molecule at the polymer ends was obtained.

REFERENCE EXAMPLE 3

A flask equipped with a stirrer was charged with 300 g of polypropylene oxide triol having an average molecular weight of 3,000, and then with 9.2 g of sodium metal and 600 ml of xylene. The reaction was carried out at 120° C. for 5 hours in a nitrogen stream. The temperature was dropped to 80° C. and 17.4 g of dibromomethane was added to the flask, and the reaction was continued at that temperature for 5 hours for increasing the molecular weight of polypropylene oxide as disclosed in Japanese Unexamined Patent Publication (Tokkyo Kokai) No. 134095/1978. To the flask was then added 36.2 g of acrylic chloride, and the reaction was carried out at 80° C. for 6 hours to introduce acryloyl group into the chain end of polypropylene oxide.

The reaction mixture was cooled to room temperature and filtered to remove a salt. Xylene was then removed by an evaporator to give a polymer having an average molecular weight of about 6,100, and having about four $CH_2=CHCO-$ groups per molecule at the polymer ends (which was determined by iodine value analysis).

To a flask equipped with a stirrer were added 61 g of the obtained polymer and 5.4 g of γ-aminopropyltrimethoxysilane. They were reacted at 110° C. for 10 hours to produce a polyether having an average molecular weight of about 6,600 and having about 3 trimethoxysilyl groups per molecule at the polymer chain ends.

EXAMPLE 1

To a solution of 100 parts of hexamethylenetetramine-containing cashew modified novolak phenol resin (commercially available under the trademark "Sumilite Resin PR-12687" made by Sumitomo Bakelite Co., Ltd.) dissolved in 100 parts of methyl ethyl ketone were added 100 parts of the polypropylene oxide having silicon-containing reactive groups obtained in Reference Example 2, 1 part of 2,2'-methylene-bis(4-methyl-6-t-butylphenol) and 2 parts of dibutyl tin dilaurate. They were thoroughly admixed.

The thus obtained solution was poured into a polyethylene mold and aged at 50° C. for 10 days to give a cured sheet having a thickness of 2 mm. The sheet was heat-treated at 150° C. for 1 hour, and was punched to give No. 3 dumbbell specimens provided in Japanese Industrial Standard (JIS) K 6301. The specimens were subjected to a tensile test at a rate of tension of 500 mm/min. The tensile strength at break was 140 kg/cm$^2$ and the elongation at break was 90%.

EXAMPLES 2 to 6

Sheet-like cured products were prepared in the same manner as in Example 1 by employing the phenol resin and polyether having silicon-containing reactive groups shown in Table 1, and the physical properties thereof were measured.

The results are shown in Table 1.

In Table 1, Sumilite Resin PR-50775 and PR-175 are a hexamethylenetetramine-containing alkylphenol modified novolak phenol resin and an alkylphenol modified resol phenol resin, respectively, made by Sumitomo Bakelite Co., Ltd.

EXAMPLE 7

A composition was prepared by heating a mixture of 50 parts of polypropylene oxide having silicon-containing reactive group obtained in Reference Example 2, 0.5 part of 2,2'-methylene-bis(4-methyl-6-t-butylphenol), 100 parts Sumilite Resin PR-12687 and 80 parts of a white birch flour (particle size: 100 meshes) at 80° C. and kneading well by a kneader. The composition was pulverized by a pulverizer. The obtained powder was placed in a mold having a depth of 10 mm and set at 150° C. to plasticize, and was pressed at 150° C. and 100 kg/cm$^2$ for 1 hour.

Specimens having a section area of 10×12 mm were cut off from the obtained molding, and subjected to an Izod impact test with U-notch according to JIS K 6911. The impact strength was 4.8 kg.cm/cm$^2$.

EXAMPLE 8

The procedure of Example 7 was repeated except that 50 parts of the polyether obtained in Reference Example 1 and 100 parts of a novolak phenol resin (commercially available under the trademark "Sumilite Resin PR-217" made by Sumitomo Bakelite Co., Ltd.) were employed instead of 50 parts of the polypropylene oxide obtained in Reference Example 2 and 100 parts of Sumilite Resin PR-12687, and kneading was conducted by heat rolls at 95° C.

The Izod impact strength of the obtained molding was 4.6 kg.cm/cm$^2$.

COMPARATIVE EXAMPLES 2 and 3

The procedures of Examples 7 and 8 were repeated except that no polyethers having silicon-containing reactive groups were employed. The Izod impact strengths of the obtained moldings were 1.5 kg.cm/cm$^2$ and 1.3 kg.cm/cm$^2$, respectively.

EXAMPLE 9

To a solution of 100 parts of Sumilite Resin PR-12687 dissolved in 50 parts of methyl ethyl ketone were added 100 parts of the polypropylene oxide having silicon-containing reactive groups obtained in Reference Example 2, 1 part of 2,2'-methylene-bis(4-methyl-6-t-butylphenol), 5 parts of methylhydrogenpolysiloxane ("TSF 484" made by Toshiba Silicone Kabushiki Kaisha) and 5

TABLE 1

| | Composition | | | | Properties of cured product | |
|---|---|---|---|---|---|---|
| Ex. | Polyether having silicon-containing reactive group | Amount (part) | Phenol resin | Amount (part) | Tensile strength at break (kg/cm$^2$) | Elongation at break (%) |
| 2 | Ref. Ex. 2 | 100 | Sumilite resin PR-12687 | 60 | 80 | 200 |
| 3 | " | 100 | Sumilite resin PR-50775 | 100 | 130 | 70 |
| 4 | " | 100 | Sumilite resin PR-175 | 60 | 70 | 160 |
| 5 | Ref. Ex. 1 | 100 | Sumilite resin PR-12687 | 80 | 130 | 80 |
| 6 | Ref. Ex. 3 | 100 | Sumilite resin PR-12687 | 80 | 110 | 80 |

COMPARATIVE EXAMPLE 1

A sheet-like cured product was prepared in the same manner as in Example 1 except that no phenol resin was employed. The sheet only had a tensile strength as low as 5 kg/cm$^2$.

parts of silicic acid anhydride. They were thoroughly admixed. To the mixture were added 3 parts of dibutyl tin dilaurate and 1 part of laurylamine, and after thoroughly admixing them, the mixture was cured in a dryer at 50° C. for 3 days to give a foam. The foam was then heat-treated in a dryer at 150° C. for 1 hour to give a flexible, tough foam having a specific gravity of 0.25 and being bendable at an angle of about 90°.

COMPARATIVE EXAMPLE 4

A foam was prepared in the same manner as in Example 9 except that no polypropylene oxide obtained in Reference Example 2 was employed. The foam was easily broken by bending, thus was non-flexible and very fragile.

In addition to the ingredients used in the Examples, other ingredients can be used in the Examples as set forth in the specification to obtain substantially the same results.

What we claim is:

1. A curable composition comprising (A) a phenol resin selected from the group consisting of a resol phenol resin, a modified resol phenol resin, a novolak phenol resin and a modified novolak phenol resin, said novolak phenol resins containing a curing agent, and (B) 1 to 200 parts by weight of, per 100 parts by weight of the phenol resin, a polyether having at least one silicon-containing reactive group in its molecule, the main chain of said polyether consisting essentially of recurring units of the formula —R—O—, wherein R is a bivalent alkylene group having 2 to 4 carbon atoms, and said silicon-containing reactive group being a group of the formula:

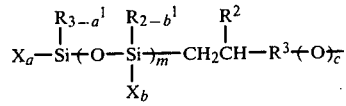

wherein X is hydroxyl group or a hydrolyzable group, $R^1$ is a monovalent hydrocarbon group having 1 to 20 carbon atoms or an organosiloxy group, a is 0, 1, 2 or 3, b is 0, 1 or 2, m is 0 or an integer of 1 to 18, $R_2$ is hydrogen or a monovalent organic group having 1 to 20 carbon atoms, $R_3$ is a bivalent organic group having 1 to 20 carbon atoms, and c is 0 or 1, with the proviso that a and b are not both zero at the same time.

2. The composition of claim 1, wherein said polyether (B) is polypropylene oxide.

3. The composition of claim 1, wherein said hydrolyzable group is a member selected from the group consisting of hydrogen atom, a halogen atom, an alkoxyl group, a ketoxymate group, an amino group, an amide group, an aminoxy group, a mercapto group and an alkenyloxy group.

4. The composition of claim 1, wherein said polyether (B) is a polyether having at least one silicon-containing reactive group at the polymer chain end.

5. The composition of claim 1, wherein said polyether (B) is a polyether having at least one alkoxysilyl group at the polymer chain end.

6. The composition of claim 1, wherein said polyether (B) is present in an amount of 1 to 100 parts by weight per 100 parts by weight of said phenol resin (A).

7. The composition of claim 1, wherein said polyether (B) is present in an amount of 80 to 200 parts by weight per 100 parts by weight of said phenol resin (A).

* * * * *